US005349748A

United States Patent [19]

Hara

[11] Patent Number: 5,349,748

[45] Date of Patent: Sep. 27, 1994

[54] METHOD OF MANUFACTURING A TAPPET FOR AN INTERNAL COMBUSTION ENGINE

[75] Inventor: Nobuo Hara, Fujisawa, Japan

[73] Assignee: Fuji Oozx, Inc., Japan

[21] Appl. No.: 103,223

[22] Filed: Aug. 9, 1993

Related U.S. Application Data

[62] Division of Ser. No. 37,227, Mar. 26, 1993, Pat. No. 5,269,268.

[51] Int. Cl.[5] .................. B23P 15/00

[52] U.S. Cl. .................. 29/888.43; 29/888.03; 29/888.46

[58] Field of Search .................. 29/888.43, 888.03, 888.4, 29/888.46; 123/90.48, 90.51, 90.52; 74/569

[56] References Cited

U.S. PATENT DOCUMENTS

| | | | |
|---|---|---|---|
| 1,247,366 | 11/1917 | Brockway | 29/888.03 |
| 2,891,525 | 6/1959 | Moore | 123/90.51 |
| 2,933,949 | 4/1960 | Bouwkamp | 123/90.48 |
| 3,255,513 | 6/1966 | Robinson et al. | 29/888.03 |
| 3,470,983 | 10/1969 | Briggs | 123/90.51 |
| 4,508,067 | 4/1985 | Fuhrmann | 123/90.51 |
| 4,829,950 | 5/1989 | Kanamaru et al. | 123/90.51 |
| 4,850,095 | 7/1989 | Akao et al. | 29/888.03 |
| 4,909,198 | 3/1990 | Shiraya et al. | 123/90.51 |

*Primary Examiner*—Irene Cuda
*Attorney, Agent, or Firm*—Michael A. Painter

[57] ABSTRACT

A method of manufacturing a tappet used in a valve operating mechanism of a direct acting type in an internal combustion engine. A tip engaged with a center bore of an inner upper surface of a tappet body includes upper and lower convex surfaces and a rounded upper circumferential corner having a certain curvature. thereby preventing concentration of stress even if the tip is subject to high compression load. Thus, durability and reliablity of the tappet are increased.

3 Claims, 3 Drawing Sheets

METHOD OF MANUFACTURING A TAPPET FOR AN INTERNAL COMBUSTION ENGINE

This is a continuation of application Ser. No. 08/037,227 filed Mar. 26, 1993, now U.S. Pat. No. 5,269,268.

BACKGROUND OF THE INVENTION

The present invention relates to a method of manufacturing tappet for use in a valve-operating mechanism of a direct-acting type in an internal combustion engine.

In order to increase allowable maximum speed and maximum brake power in an engine, DOHC-type engines have been used. Also, in order to lighten the valve operating system, a tappet (valve lifter) for use in the valve operating system has been made of aluminum alloy, instead of conventional steel, such as in Japanese Patent Laid-Open Pub. No. 1-815607.

Aluminum alloy tappets have strength, rigidity and wear resistance lower than those in steel tappets, so that wear resistant metal has been generally applied to a contact surface between a rotary cam and the axial end of an engine valve.

FIG. 3 illustrates a known tappet in a valve operating mechanism of a direct acting type, in which 1 denotes a cylinder head: and 2 denotes a tappet body which slidably contacts the cylinder head 1 and comprises a cylinder the upper end of which is closed. With a larger diameter recess *2a* and a smaller diameter engage bore *2b* formed at the upper surface and inner surface respectively in the tappet body 2 are engaged a wear resistant metal circular shim 3 and a smaller diameter tip 4 respectively.

The lower surface of the tip 4 contacts the axial end of an engine valve 8 connected with the cylinder head 1 by a pair of cotters 5 and 5, a spring retainer 6, a valve spring 7, etc. The upper surface of the shim 3 slidably contacts a rotary cam 9 the center of which is disposed on an axis of the engine valve 8.

In the foregoing tappet used in the direct-acting valve operating mechanism, driving force by the rotary cam 9 acts against the tip 4 as high compression load repeatedly. Therefore, when the upper and lower surfaces of the tip 4 are formed to be flat and the corners of the tip 4 engaged within the engage bore *2b* are formed as a right angle, stress is concentrated to the corners, thereby causing a crack 10 as shown in FIG. 3.

The outer circumference of the tappet body 2 is worn, thereby causing abnormal operation such as clattering and surging, so that the axial end of the engine valve 8 partially contacts the lower surface of the tip 4, thereby causing one-sided wear at the contact surface.

In order to overcome the foregoing disadvantages, the object of the invetion is to provide a method of manufacturing a durable and reliable tappet and a method of manufacturing it while preventing concentration of stress to a tip engage portion in a tappet body and preventing one-sided wear at a contact surface between a tip and an engine valve.

According to the present invention, there is provided a method of manufacturing a tappet for use in an internal combustion engine, comprising a tappet body closed at the upper end and having an engage bore at a center of an inner upper surface, and a tip which has upper and lower convex surfaces and a rounded upper circumferential corner having a certain curvature, the tip being fitted in the engage bore, the lower surface of the tip contacting an axial end of an engine valve.

According to the present invention, there is provided a method of manufacturing a tappet as above, comprising the steps of forming an engage bore having a flat upper surface at a center of an inner upper surface of a plastically deformable cylindrical tappet which is closed at the upper end; inserting a tip having upper and lower convex surfaces and a rounded upper circumferential corner having a certain curvature into the engage bore; and pressing the tip strongly until the inner upper surface of the engage bore is plastically deformed to form a concave surface corresponding to the upper surface of the tip and to caulk a downward circumferential projection around the engage bore inwardly.

The advantages of the present invention method of manufacturing are as follows:

a) The upper surface of the tip is convex and the upper circumferential corner is rounded to have a certain curvature, thereby avoiding concentration of stress at the tip circumference engaged with the tappet body. No cracks are caused at the corner, thereby increasing durability and reliablity of the tappet.

b) The lower surface of the tip is convex, thereby preventing partial contact of the axial end of the engine valve on the tip. Thus, one-sided wear at each contact surface is prevented.

c) The concave surface of the engage bore in the tappet body is formed by pressing the tip itself strongly, thereby facilitating the manufacturing process and increasing productivity of the tappet.

BRIEF DESCRIPTION OF THE DRAWINGS

The foregoing features and advantages of the present invention will become more clear by the following description with respect to drawings wherein.

PREFERRED EMBODIMENTS OF THE INVENTION

The same numerals are allotted to the same members as those in known examples as described above.

Figure 1:
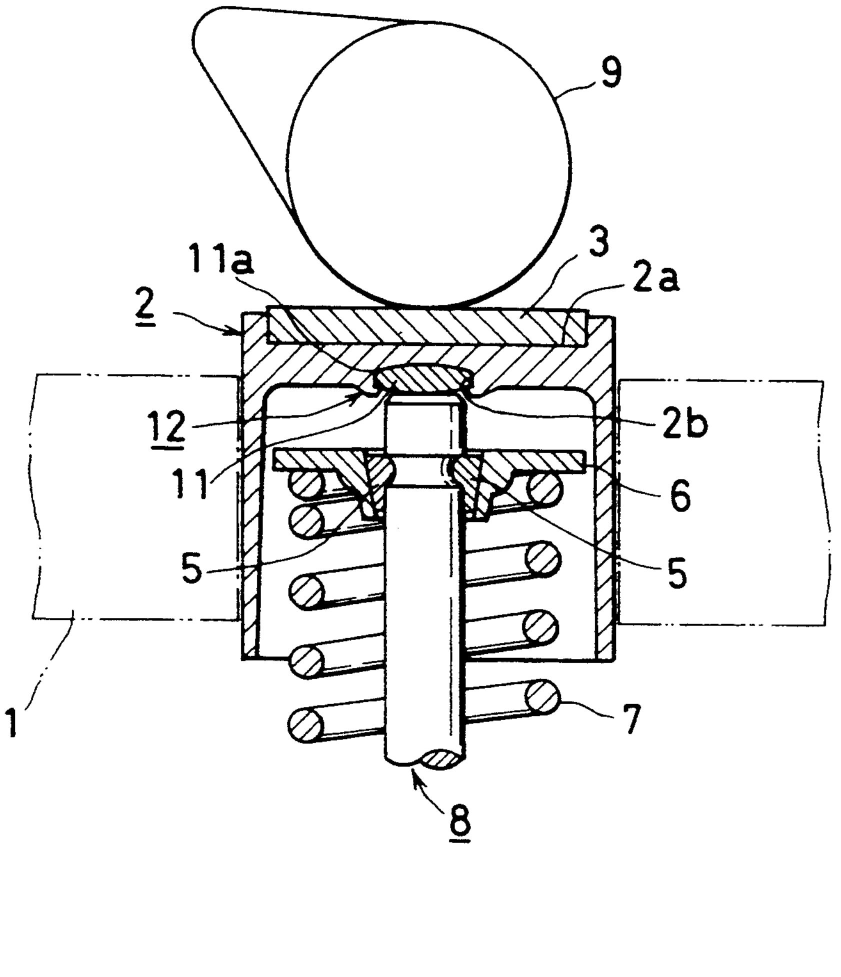
FIG. 1 is a central longitudinal sectioned front view which illustrates a tappet in a valve operating mechanism of a direct acting type of the present invention.

In FIG. 1, a tappet body 2 moulded out of aluminum alloy is similar to a known tappet body. A recess *2a* on the upper surface contacts a shim 3 similar to the foregoing shim. With a concaved engage bore *2b* at an inner upper surface of the tappet body 2 is engaged a wear resistant metal tip 11 which comprises convex upper and lower surfaces and a rounded upper circumferential corner *11a* having a certain curvature, the tip 11 being prevented from disengaging by caulking a downward circumferential projection 12 around the engage bore *2b* inwardly in a radial direction. The lower surface of the tip 11 contacts the axial end of the engine valve 8.

A method of manufacturing the tappet or fitting the tip 11 in the tappet body 2 will be hereinafter described.

Figure 2A:
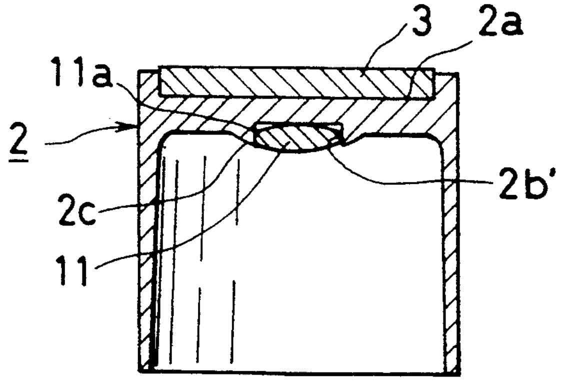
FIG. 2(A), (B) and (C) are views which illustrate a process for manufacturing the tappet.

As shown in FIG. 2(A), at the center of the upper inner surface of the tappet body 2, there is formed an engage bore *2b'* having substantially the same diameter as the tip 11 to be fitted and a flat upper inner surface; and a tapered downward circumferential projection *2c*.

Then, the rounded upper circumference 11*a* of the tip 11 is inserted upwardly into the engage bore 2*b*'.

Figure 2B:
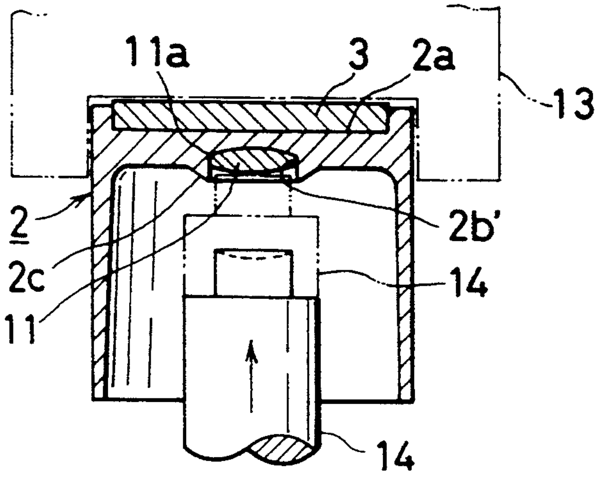

As shown in FIG. 2(B), while the upper end of the tappet body 2 is held by a stationary support 18, the lower surface of the tip 11 is strongly pressed upwardly by a pressing jig 14, so that the inner surface of the engage bore 2*b*' is plastically deformed by the tip 11 itself, thereby forming a concaved surface corresponding to the surface of the tip 11.

Figure 2C:
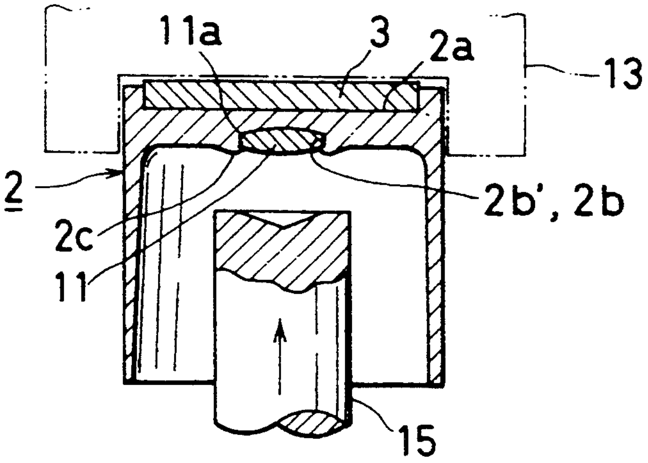
Figure 3:
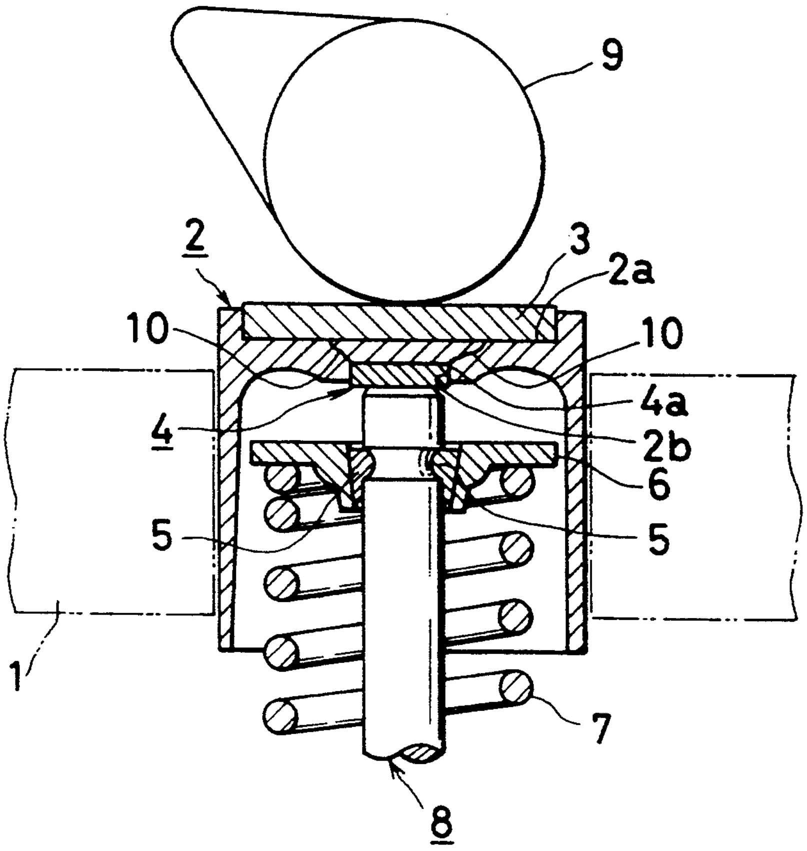
FIG.3 PRIOR ART
FIG. 3 is a central longitudinal sectioned front view of a known tappet.

Finally, as shown in FIG. 2(C), the circumferential projection 2*c* is inwardly bent by upward movement of the jig 15, so that the tip 11 is caulked and fixed within the engage bore 2*b*.

As above, the concave surface of the engage bore 2*b* in the tappet body 2 is plastically deformed by strong pressing of the tip 11 itself, thereby saving troublesome mechanical working for forming such a concave surface and increasing productivity to decrease cost. In the above process, if the upper end of the pressing jig 14 is modified in form, strong pressing of the tip may be made simultaneously with caulking.

The foregoing merely relates to an embodiment of the invention. It is to be understood by persons skilled in the art that various modifications and changes may be made without departing from the scope of claims as follows:

What is claimed is:

1. A method of manufacturing a tappet for use in an internal combustion engine comprising the steps of:

providing a plastically deformable, cup-shaped cylindrical tappet body closed at an upper end and having an inner upper surface;

forming an engage bore having a flat upper surface at the center of the inner upper surface of the cylindrical tappet body;

inserting a tip having upper and lower convex surfaces and a rounded upper circumferential corner having a certain curvature within the engage bore; and imposing force upon the lower convex surface of the tip plastically deforming the inner upper surface of the engage bore forming a concave surface in the inner upper surface of the engage bore corresponding to the upper convex surface of the tip.

2. A method for manufacturing a tappet as defined in claim 1 including the step of deforming inwardly the inner upward surface of said cylindrical tappet body adjacent the engage bore fixing said tip within the engage bore.

3. A method of manufacturing a tappet comprising the steps of:

forming an engage bore having a flat upper surface at a center of an inner upper surface of a plastically deformable cylindrical tappet body which is closed at an upper end;

inserting a tip having upper and lower convex surfaces and a rounded upper circumferential corner having a certain curvature into the engage bore;

pressing the tip strongly until the inner upper surface of the engage bore is plastically deformed to form a concave surface corresponding to the upper surface of the tip and to caulk a downward circumferential projection around the engage bore inwardly.

* * * * *